United States Patent
Liu et al.

(10) Patent No.: US 12,106,543 B2
(45) Date of Patent: Oct. 1, 2024

(54) METHOD FOR EXTRACTING SPECTRAL INFORMATION OF A SUBSTANCE UNDER TEST

(71) Applicant: SHENZHEN HYPERNANO OPTICS TECHNOLOGY CO., LTD., Shenzhen (CN)

(72) Inventors: Min Liu, Shenzhen (CN); Zhe Ren, Shenzhen (CN); Xingchao Yu, Shenzhen (CN); Jinbiao Huang, Shenzhen (CN); Bin Guo, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 567 days.

(21) Appl. No.: 17/603,318

(22) PCT Filed: Mar. 30, 2020

(86) PCT No.: PCT/CN2020/081962
§ 371 (c)(1),
(2) Date: Oct. 12, 2021

(87) PCT Pub. No.: WO2021/195817
PCT Pub. Date: Oct. 7, 2021

(65) Prior Publication Data
US 2022/0207856 A1    Jun. 30, 2022

(51) Int. Cl.
*G06K 9/00*    (2022.01)
*G01J 3/28*    (2006.01)
(Continued)

(52) U.S. Cl.
CPC ............ *G06V 10/58* (2022.01); *G01J 3/2803* (2013.01); *G01N 21/25* (2013.01); *G01N 21/27* (2013.01);
(Continued)

(58) Field of Classification Search
CPC ........ G06V 10/10; G06V 10/12; G06V 10/14; G06V 10/143; G06V 10/147; G06V 10/22;
(Continued)

(56) References Cited

U.S. PATENT DOCUMENTS 7,792,367 B2 *    9/2010    Kanamori ............... G06T 7/514
                                                      382/224
8,611,674 B1 *    12/2013    Beeler .................... G06V 10/60
                                                      382/218
(Continued)

FOREIGN PATENT DOCUMENTS

CN    104700109 A    6/2015
CN    106841118 A    6/2017

OTHER PUBLICATIONS

International Search Report of PCT/CN2020/081962 dated Dec. 31, 2020 (9 pages).
(Continued)

*Primary Examiner* — Eric Rush
(74) *Attorney, Agent, or Firm* — Calfee, Halter & Griswold LLP

(57) ABSTRACT

A method for extracting spectral information of a substance under test includes: identifying a pixel region A(x, y) occupied by an object under test from a hyperspectral image acquired; extracting a specular reflection region $A_q$ and a diffuse reflection region $A_r$ from the pixel region A(x, y), and calculating a representative spectrum $I_q(\omega)$ of the specular reflection region $A_q$ and a representative spectrum $I_r(\omega)$ of
(Continued)

the diffuse reflection region $A_r$, respectively; by comparing each element in the representative spectrum $I_q(\omega)$ of the specular reflection region $A_q$ with each element in the representative spectrum $I_r(\omega)$ of the diffuse reflection region $A_r$, separating information of a light source from spectral information of the object to obtain a first spectral invariant $C(\omega)$. This method does not require additional spectral information of the light source, which improves the analysis efficiency.

13 Claims, 2 Drawing Sheets

(51) Int. Cl.
  *G01N 21/25* (2006.01)
  *G01N 21/27* (2006.01)
  *G01N 21/31* (2006.01)
  *G01N 21/55* (2014.01)
  *G06T 7/90* (2017.01)
  *G06V 10/143* (2022.01)
  *G06V 10/25* (2022.01)
  *G06V 10/58* (2022.01)
  *H04N 5/30* (2006.01)
  *H04N 23/10* (2023.01)

(52) U.S. Cl.
  CPC ............ *G01N 21/31* (2013.01); *G01N 21/55* (2013.01); *G06T 7/90* (2017.01); *G06V 10/143* (2022.01); *G06V 10/25* (2022.01); *H04N 5/30* (2013.01); *H04N 23/10* (2023.01); *G01J 2003/2826* (2013.01); *G01N 2021/556* (2013.01); *G01N 2021/557* (2013.01)

(58) Field of Classification Search
  CPC ........ G06V 10/25; G06V 10/40; G06V 10/42; G06V 10/58; G06V 10/70; G06V 10/82; G06T 7/90; G06T 2207/10024; G06T 2207/10036; G01J 3/0205; G01J 3/0208; G01J 3/0254; G01J 3/28; G01J 3/2803; G01J 3/2823; G01J 3/40; G01J 3/42; G01J 3/457; G01J 3/50; G01J 3/51; G01J 2003/2826; G01J 2003/2886; G01J 2003/425; G01N 21/01; G01N 21/17; G01N 21/25; G01N 21/255; G01N 21/27; G01N 21/29; G01N 21/31; G01N 21/3103; G01N 21/41; G01N 21/47; G01N 21/4738; G01N 21/55; G01N 21/62; G01N 21/84; G01N 21/88; G01N 21/8803; G01N 21/8806; G01N 21/8851; G01N 2021/1765; G01N 2021/258; G01N 2021/3129; G01N 2021/4702; G01N 2021/473; G01N 2021/4733; G01N 2021/4735; G01N 2021/555; G01N 2021/556; G01N 2021/557; G01N 2021/558; G01N 2021/559; G01N 2021/8845; G01N 2021/8887; G01N 2201/102; G01N 2201/105; G01N 2201/12; G01N 2201/121; G01N 2201/129; G01N 2201/1293; G01N 2201/1296; A61B 5/0075; H04N 5/30; H04N 5/66; H04N 23/10; H04N 23/11; G01B 11/00; G01B 11/2441; G01B 2210/50; G06N 3/08; G02B 21/0032; G02B 21/0064
  USPC ....... 382/100, 103, 108, 110, 155, 159, 162, 382/165, 167, 170, 173, 181, 190, 191, 382/206, 207, 224, 254, 271, 272, 382/274–276, 286, 312, 325; 702/1, 19, 702/22–25, 27, 28, 30, 66, 70–73, 75, 76, 702/179, 189–191, 194, 195, 199; 250/227.23, 390.07; 356/237.1, 300–303, 356/306–308, 319, 320, 326, 450, 451, 356/456, 504, 601, 612
  See application file for complete search history.

(56) References Cited

U.S. PATENT DOCUMENTS

| | | | |
|---|---|---|---|
| 11,017,564 B2 * | 5/2021 | Kuwada | ................... G06T 7/44 |
| 2007/0239315 A1 | 10/2007 | Sato et al. | |
| 2016/0198132 A1 | 7/2016 | He et al. | |
| 2022/0008157 A1 * | 1/2022 | Maier-Hein | ........... G06V 10/60 |

OTHER PUBLICATIONS

European Search Report from European Application No. 20928567.5 date Oct. 31, 2022 (9 pages).

Zhao Liu et al: "Skin image illumination modeling and chromophore identification for melanoma diagnosis", Physics in Medicine and Biology, Institute of Physics Publishing, Bristol GB, vol. 60, No. 9, Apr. 9, 2015 (Apr. 9, 2015), pp. 3415-3431.

* cited by examiner

METHOD FOR EXTRACTING SPECTRAL INFORMATION OF A SUBSTANCE UNDER TEST

CROSS REFERENCE TO RELATED APPLICATIONS

This application is a national application of PCT/CN2020/081962, filed on Mar. 30, 2020, the contents of which are all hereby incorporated by reference.

FIELD

The present application relates to the field of hyperspectral analysis, particularly to a method for extracting spectral information of a substance under test.

BACKGROUND

Hyperspectral imaging (HSI) technology can obtain image information and spectral information at the same time. It can perform spectral analysis depending on the spectrum while identifying an object using a machine vision technology, which is a new promising technology. The spectral analysis capability of hyperspectral imaging technology comes from the fact that hypespectral images collect spectral information emitted by a substance at different wavelengths, and the spectral information directly reflect information such as the physical and chemical composition of the substance. Combined with information such as image recognition, region selection, etc., the HSI technology can realize complete automation from target detection, composition determination, to result output.

Spectral analysis can quickly and non-destructively obtain the composition information of a substance, and provide efficient and inexpensive solutions for process control and quality inspection. It is an important cornerstone of systems such as industrial automation, Internet of things, etc. The components of a substance will absorb, reflect and scatter light, thereby changing the spectral lineshape of the reflected or transmitted light. Different components interacts differently with light, resulting in that substances of different composition have different spectral lineshapes. Spectral analysis is to infer the physical properties and chemical composition of a substance by analyzing the spectral lineshape of the substance.

Hyperspectral analysis relies on accurate spectral information of a substance, but the collected original spectrum or spectral image contains three kinds of information: spectrum of the substance (reflectance of the substance), geometrical information of the photographing scene, and spectrum of the light source (spectral irradiance of the light source). However, since the analysis only needs spectrum of the substance, the influences of other parts need to be eliminated. The widely accepted solution is to additionally provide spectral information of the light source to the algorithm of extracting the substance spectral information of the object under test, eliminating the influences of the spectrum of the light source and geometrical information of scenes through mathematical calculations.

In HSI applications, there are two common ways to obtain the spectrum of the light source: to memorize the spectrum of the light source of the device, or to use a reference light path. The former refers to directly importing saved spectral information of the light source obtained before leaving the factory during data analysis. Since the spectrum of the light source may change with the use environment, use time, etc., this method is low in accuracy. The latter is to install an additional mechanical structure to measure the spectrum of the light source in real time. However, this method requires additional optical-electromechanical structure in the design of the device, making it complex and difficult to maintain. Either way complicates the process of data analysis and reduces the efficiency of analysis.

At present, there is still a lack of a HSI-based spectral analysis method in the prior art, which can take into account simple hardware design, a simple process of extracting spectral information of a substance under test, and high-accuracy measurement. Common hyperspectral analysis methods mainly include collection of a sample spectrum, collection of a reference spectrum, and extraction of the spectral information of a substance under test. At the time of extracting the substance spectral information of the object, it is necessary to acquire the spectral information of the light source of the scene in advance, which inevitably intricates the data analysis process, complicates the optical-electromechanical structure of the photographing device, or decreases the accuracy of analysis.

In view of this, it is vital to design a method capable of extracting spectral information of a substance of an object in an effective and convenient way.

SUMMARY

With respect to the problems of complicated data analysis process, complex optical-electromechanical structure of the HSI device, and low analysis accuracy in hyperspectral analysis method of spectral information extraction, an embodiment of the present application provides a method for extracting spectral information of a substance under test to solve the above-mentioned problems.

In a first aspect of the present application, a method is provided for extracting spectral information of a substance under test, comprising the following steps:

S1: obtaining the pixel region $A(x, y)$ occupied by an object under test from a hyperspectral image acquired;

S2: extracting a specular reflection region $A_q$ and a diffuse reflection region $A_r$ from the pixel region $A(x, y)$, and respectively calculating a representative spectrum $I_q(\omega)$ of the specular reflection region $A_q$ and a representative spectrum $I_r(\omega)$ of the diffuse reflection region $A_r$;

S3: by comparing each element in the representative spectrum $I_q(\omega)$ of the specular reflection region $A_q$ with each element in the representative spectrum $I_r(\omega)$ of the diffuse reflection region $A_r$, separating information of a light source and substance spectral information of the object to obtain a first spectral invariant $C(\omega)$.

The first spectral invariant obtained by the method can eliminate the influence of the spectrum of the light source.

In some embodiments, the method further comprises the following step: S4: performing linear transformation processing on the first spectral invariant $C(\omega)$ to obtain a second spectral invariant $R(\omega)$, the second spectral invariant $R(\omega)$ being used for spectral analysis. The first spectral invariant eliminates the influence of the light source and omits additional spectral information of the light source, so that the second spectral invariant obtained by normalizing the first spectral invariant can further remove the influence of factors such as the spectrum of the light source, the photographing environment, etc.

In some embodiments, in step S1 a first region selection method is used to identify the substance under test and select the pixel region $A(x, y)$, the first region selection method comprising manual labeling, a machine vision algorithm, spectral angle mapping or a deep learning algorithm. These methods can efficiently distinguish the object under test in the hyperspectral image from the background, identify the object under test, and obtain the pixel data of the object under test in the hyperspectral image.

In some embodiments, step S2 comprises:

S21: extracting the specular reflection region $A_q$ and the diffuse reflection region $A_r$ from the pixel region $A(x, y)$ by using a second region selection method;

S22: obtaining the representative spectrum $I_q(\omega)$ according to the specular reflection region $A_q$, and obtaining the representative spectrum $I_r(\omega)$ according to the diffuse reflection region $A_r$.

The representative spectra of the two different regions can represent the spectra of most pixels in the two regions.

In some embodiments, the second region selection method comprises principal component analysis, k-means, orthogonal projection, or a region selection based on geometric shapes. The second region selection method can be used to obtain the specular reflection region and the diffuse reflection region, making it convenient to calculate spectral data of the two regions respectively.

In some embodiments, a method for calculating the representative spectrum $I_q(\omega)$ of the specular reflection region $A_q$ and the representative spectrum $I_r(\omega)$ of the diffuse reflection region $A_r$ comprises taking the average, taking a brightness weighted average, or a gray world algorithm. With these methods, spectral data of most pixels representing the specular reflection region and the diffuse reflection region can be calculated respectively.

In some embodiments, the average spectra of all pixels in the specular reflection region $A_q$ and the diffuse reflection region $A_r$ are calculated respectively according to the specular reflection region $A_q$ and the diffuse reflection region $A_r$, and are considered the representative spectrum $I_q(\omega)$ and the representative spectrum $I_r(\omega)$:

$$I_q(\omega) = \frac{1}{N_q} \sum_{(x_a, y_b) \in A_q} i(x_a, y_a, \omega),$$

$$I_r(\omega) = \frac{1}{N_r} \sum_{(x_a, y_b) \in A_r} i(x_a, y_a, \omega),$$

where $N_q$ and $N_r$ respectively represent numbers of pixels in the specular reflection region $A_q$ and the diffuse reflection region $A_r$, and $i(x_a, y_a, \omega)$ represents the spectrum of pixel at a position $(x_a, y_a)$. By calculating the average spectra of all pixels in the two regions, representative spectra representing the two regions can be obtained.

In some embodiments, the method for calculating the first spectral invariant $C(\omega)$ in step S3 comprises finite element decomposition, spectral angle separation or division.

In some embodiments, each element in the representative spectrum $I_q(\omega)$ of the specular reflection region $A_q$ is divided by each element in the representative spectrum $I_r(\omega)$ of the diffuse reflection area $A_r$ to obtain the first spectral invariant $C(\omega)$: $C(\omega) = I_q(\omega)/I_r(\omega)$.

In some embodiments, step S4 comprises:

S41: performing standard normal variate transformation (SNV) on the first spectral invariant $C(\omega)$ to obtain the second spectral invariant $R(\omega)$:

$$R(\omega) = (C(\omega) \langle C(\omega) \rangle_\omega) / \left( \sqrt{\langle C(\omega)^2 \rangle_\omega - \langle C(\omega) \rangle_\omega^2} \right)$$

where $\langle C(\omega) \rangle_\omega$ represents the average of $C(\omega)$ in wavelength dimension;

S42: using the second spectral invariant $R(\omega)$ as an input of a chemometric model for spectral analysis of the substance.

The first spectral invariant is corrected and normalized by SNV to obtain the second spectral invariant, which further eliminates the influence of factors such as the photographing environment.

In some embodiments, the chemometric model comprises a partial least-square regression, an artificial neural network or a support vector machine. Spectral analysis can be performed using these methods to predict composition of the substance.

In some embodiments, the hyperspectral image maintains a unchanged pixel region $A(x, y)$ occupied by the object under test in each wavelength band during photographing, and the object under test occupies a reasonable proportion in the hyperspectral image.

With hyperspectral images taken under aforementioned requirements, analysis can be performed by the presented method using one single hyperspectral image, which avoids errors from changes in the spectrum of the light source, baseline drift of the acquisition device, etc.

In a second aspect of the present application, an embodiment of the present application proposes a hyperspectral imager, comprising: a lens, a wavelength splitter, an imaging device, and a data storage and processing device. Light emitted from a light source is reflected at the surface of an object under test, reaching the imaging device after passing through the lens and the wavelength splitter, further converted by the data storage and processing device into electrical signal and digital signal at different wavelengths. The digital signal is spectral image data comprising spectral information of the light source and spectral information of substances at the surface of the object under test. Processed by the spectral information extraction method for objects under test as mentioned in the first aspect, spectral image data yields composition properties of the object.

An embodiment of the present application discloses a method for extracting spectral information of a substance under test. The method extracts a specular reflection region and a diffuse reflection region from the pixel region of the object under test, and calculate representative spectra of the two regions respectively, so as to calculate a light source-independent first spectral invariant, and a second spectral invariant that is independent of the spectrum of the light source, the scene, etc. Since no additional light source spectral information is needed, the part of collecting a reference spectrum can be omitted, which simplifies the analysis process, and reduces the data collection time, thus improves the analysis efficiency. Meanwhile, since there is no need to collect a reference spectrum, at the time of designing corresponding hardware, the corresponding optical-electromechanical mechanism can be omitted, leaving hardware of the related product simpler and more compact. Implementation of this method requires one single hyperspectral image, therefore avoids errors resulting from many aspects such as changes in the spectrum of the light source, the baseline drift of the acquisition device, etc., increasing the accuracy of analysis.

BRIEF DESCRIPTION OF THE DRAWINGS

The drawings are included to provide a further understanding of the embodiments, and the drawings are incorporated into this specification and constitute a part of this specification. The drawings illustrate the embodiments and together with the description serve to explain the principles of the present application. It will be easy to recognize other embodiments and many expected advantages of the embodiments because they become better understood by referring to the following detailed description. The elements in the drawings are not necessarily in proportion to each other. The same reference numerals refer to corresponding similar components.

DETAILED DESCRIPTION

Figure 1:
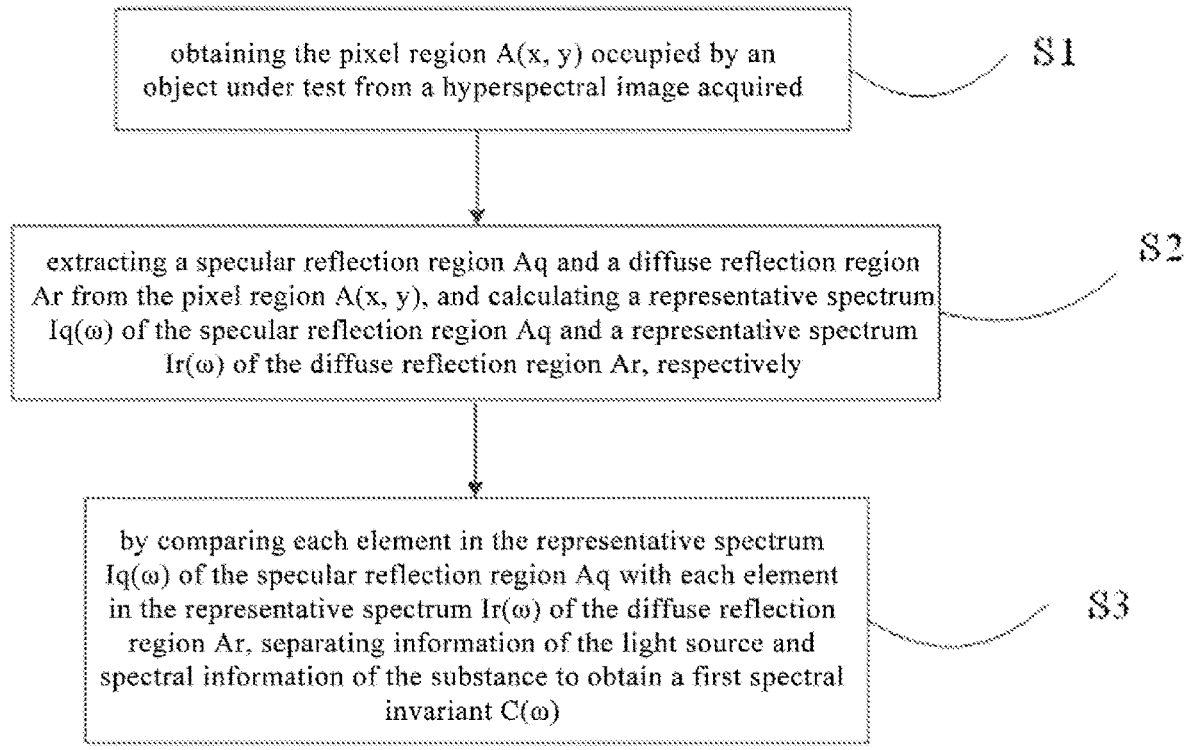
FIG. 1 is a flowchart of a method for extracting spectral information of a substance under test in an embodiment of the present application.

The present application will be further described in detail below with reference to the drawings and embodiments. It can be understood that the specific embodiments described here are only used to explain the relevant application, but not to limit the application. In addition, it is to be further noted that only portions related to the relevant application are shown in the drawings to facilitate description.

It is to be noted that the embodiments in the present application and the features in the embodiments can be combined with each other in the case of causing no conflict. The present application will be described in detail below with reference to the drawings and in conjunction with the embodiments.

As shown in FIG. 1, an embodiment of the present application provides a method for extracting spectral information of a substance under test, comprising the following steps:

S1: obtaining the pixel region A(x, y) occupied by an object under test from a hyperspectral image acquired;

S2: extracting a specular reflection region $A_q$ and a diffuse reflection region $A_r$ from the pixel region A(x, y), and calculating a representative spectrum $I_q(\omega)$ of the specular reflection region $A_q$ and a representative spectrum $I_r(\omega)$ of the diffuse reflection region $A_r$, respectively;

S3: by comparing each element in the representative spectrum $I_q(\omega)$ of the specular reflection region $A_q$ with each element in the representative spectrum $I_r(\omega)$ of the diffuse reflection region $A_r$, separating information of the light source and substance spectral information of the object to obtain a first spectral invariant $C(\omega)$.

The representative spectrum $I_q(\omega)$ of the specular reflection region $A_q$ contains the spectral information of the substance and the light source information from specular reflection, while the representative spectrum $I_r(\omega)$ of the diffuse reflection region $A_r$ only contains the substance spectral information of the object.

The aforementioned first spectral invariant $C(\omega)$ eliminates the influence of the spectrum of the light source by taking advantage of the characteristic that the specular reflection region and the diffuse reflection region contain the same diffuse reflection component but different specular reflection components (i.e. light source components). $C(\omega)$ does not change as long as the distance of photographing and the position of the light source do not change. In some engineering scenes, $C(\omega)$ can be used directly as the basis of subsequent spectral analysis, thereby effectively eliminating dependence on the light source information.

Hereinafter, analysis of an apple is taken as an example to describe an embodiment of the present application. In this embodiment, hyperspectral imaging technology is used to quickly predict the sweetness, acidity, hardness, etc. of the apple.

Firstly, the first step is to perform data collection to obtain the hyperspectral image data of an apple under test. The second step is to acquire the substance spectral information of the object, that is, to extract the substance spectral information of the object of the apple from the hyperspectral data. The third step is to perform analysis of the acquired spectrum of the substance to obtain information such as sweetness, acidity and hardness of the apple, and finally present said information to the user. The method used in the embodiment of the present application is mainly applied in the second step.

In a specific embodiment, in step S1, the object under test is identified and the pixel region A(x, y) is selected by the first region selection method. The first region selection method includes manual labeling, machine vision algorithm, spectral angle mapping or depth learning algorithm. In other optional embodiments, other methods may also be used to identify the object under test. Obtained hyperspectral image is denoted as I(x, y, ω), where x, y and ω respectively represent the width, height and wavelength of the hyperspectral image, and the first region selection method is used to identify the object under test and select the pixel region A(x, y).

Figure 3:
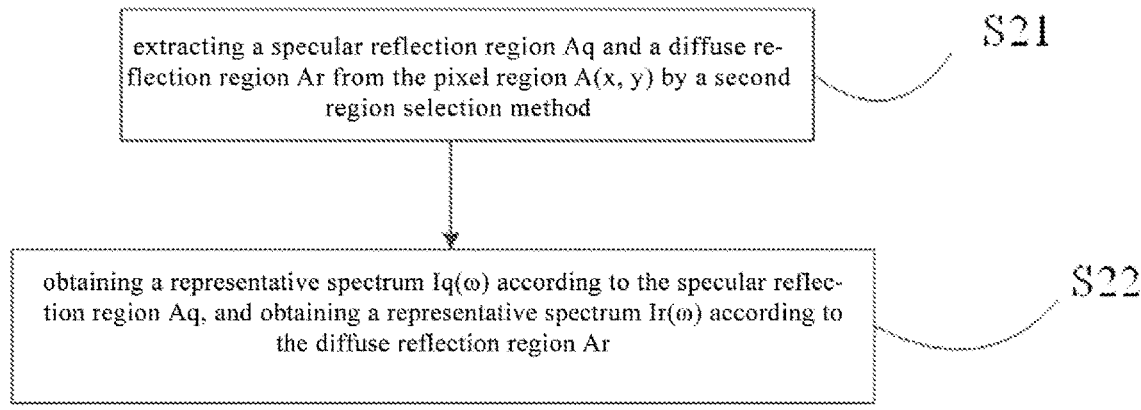
FIG. 3 is a flowchart of step S2 of the method for extracting spectral information of a substance under test in an embodiment of the present application.

Firstly, the acquired hyperspectral image needs to meet two requirements. As shown in FIG. 3, in a specific embodiment, the hyperspectral image should meet the following two requirements: 1. the pixel region A(x, y) occupied by the object under test remains unchanged in every wavelength upon photographing; 2. the object under test occupies a reasonable proportion in the hyperspectral image. Requirement 1 can be realized in the following two ways. The first is to keep the object under test and the camera unchanged during photographing; since without any change, the correspondence between each pixel and its spatial position in each image of a different wavelength is unchanged. The second is to register the pixels in each image using image registration methods such as optical flow, which may be adopted in cases where the camera or the object to be photographed is not static. Requirement 2 requires that the object under test is not far away from the camera lens upon photographing.

Mathematically, a three-dimensional matrix I(x, y, ω) is used to represent the HSI, where x, y and ω represent the width, height and wavelength of the hyperspectral image respectively, and each element $i(x_a, y_a, \omega_b)$ in the matrix represents the light intensity obtained by the pixel at the position $(x_a, y_a)$ of the image at the wavelength $\omega_b$. Therefore, the spectrum can be presented as the vector composed of light intensity data at different wavelengths, for example, $i(x_a, y_a, \omega_b)$ represents the spectrum of the pixel at $(x_a, y_a)$.

The pixel region A(x, y) occupied by the object under test is selected in the acquired hyperspectral image by the first region selection method. In a preferred embodiment, the first region selection method includes manual labeling, machine vision, and spectral angle mapping or deep learning. Other feasible image recognition technologies may also be used.

Figure 2:
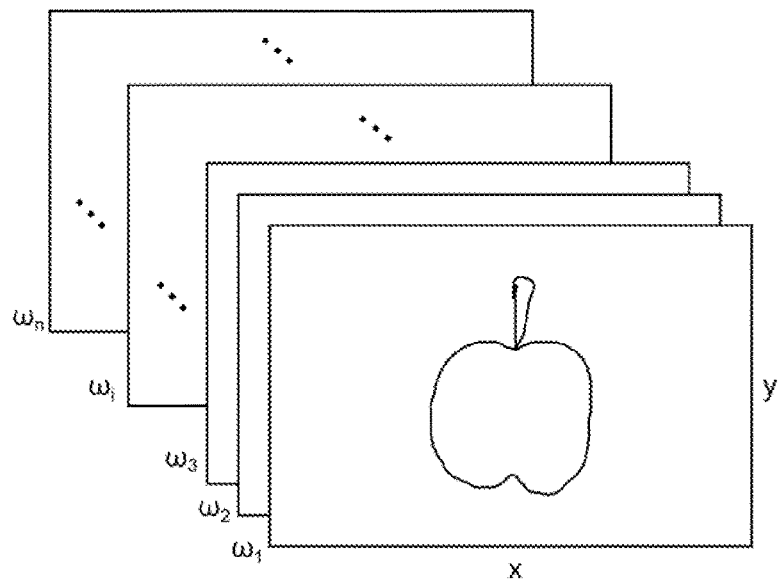
FIG. 2 is a schematic view of a spectral image in an embodiment of the present application.

The image recognition technology is very mature at present, thus the object under test can be identified from the hyperspectral image conveniently and accurately, which is also a relatively mature part of the current hyperspectral imaging analysis technology. In an embodiment of the present application, object recognition is performed through deep learning, so as to identify the apple under test in FIG. 2 and find the pixel region A(x, y) occupied by the apple.

In a specific embodiment, as shown in FIG. 3, step S2 comprises:

S21: extracting a specular reflection region $A_q$ and a diffuse reflection region $A_r$ from the pixel region A(x, y) by a second region selection method;

S22: obtaining a representative spectrum $I_q(\omega)$ according to the specular reflection region $A_q$, and obtaining a representative spectrum $I_r(\omega)$ according to the diffuse reflection region $A_r$.

The second region selection method may include principal component analysis, K-means, matrix orthogonal projection, or region selection based on geometric shapes. In a preferred embodiment, the K-means clustering method is used. With two cluster centers specified, pixels in A(x, y) are grouped into two categories according to the spectral lineshape. Since the apple surface is spherical and has on average low reflectance, the average brightness of the specular reflection region is relatively high. Therefore, the category with high average brightness is marked as the specular reflection region $A_q$, and the category with low average brightness is marked as the diffuse reflection region $A_r$.

The method for extracting representative spectra $I_q(\omega)$ and $I_r(\omega)$ from $A_q$ and $A_r$ may include taking the average, taking a brightness weighted average, or a gray world algorithm, etc. In a preferred embodiment, a method for calculating an average spectrum is used to calculate the average spectra of all pixels in the specular reflection region $A_q$ and the diffuse reflection region $A_r$ respectively according to the specular reflection region $A_q$ and the diffuse reflection region $A_r$ as the representative spectrum $I_q(\omega)$ and the representative spectrum $I_r(\omega)$:

$$I_q(\omega) = \frac{1}{N_q} \sum_{(x_a, y_b) \in A_q} i(x_a, y_a, \omega),$$

$$I_r(\omega) = \frac{1}{N_r} \sum_{(x_a, y_b) \in A_r} i(x_a, y_a, \omega),$$

wherein $N_q$ and $N_r$ respectively represent the numbers of pixels in the specular reflection region $A_q$ and the diffuse reflection region $A_r$, and $i(x_a, y_a, \omega)$ represents the spectrum of the pixel at the position $(x_a, y_a)$.

Finally, each element in the representative spectrum $I_q(\omega)$ of the specular reflection region $A_q$ is divided by each element in the representative spectrum $I_r(\omega)$ of the diffuse reflection region $A_r$ to obtain the first spectral invariant $C(\omega)$.

In a specific embodiment, the method for calculating the first spectral invariant $C(\omega)$ in step S3 includes finite element decomposition, spectral angle separation or division. In other optional embodiments, other suitable calculation methods may also be used.

In a preferred example, each element in the representative spectrum $I_q(\omega)$ of the specular reflection region $A_q$ is divided by each element in the representative spectrum $I_r(\omega)$ of the diffuse reflection region $A_r$ to obtain the first spectral invariant $C(\omega)$: $C(\omega)=I_q(\omega)/I_r(\omega)$.

In a specific embodiment, the following steps are further included:

S4: performing linear transformation processing on the first spectral invariant $C(\omega)$ to obtain a second spectral invariant $R(\omega)$, the second spectral invariant $R(\omega)$ being used for spectral analysis.

Figure 4:
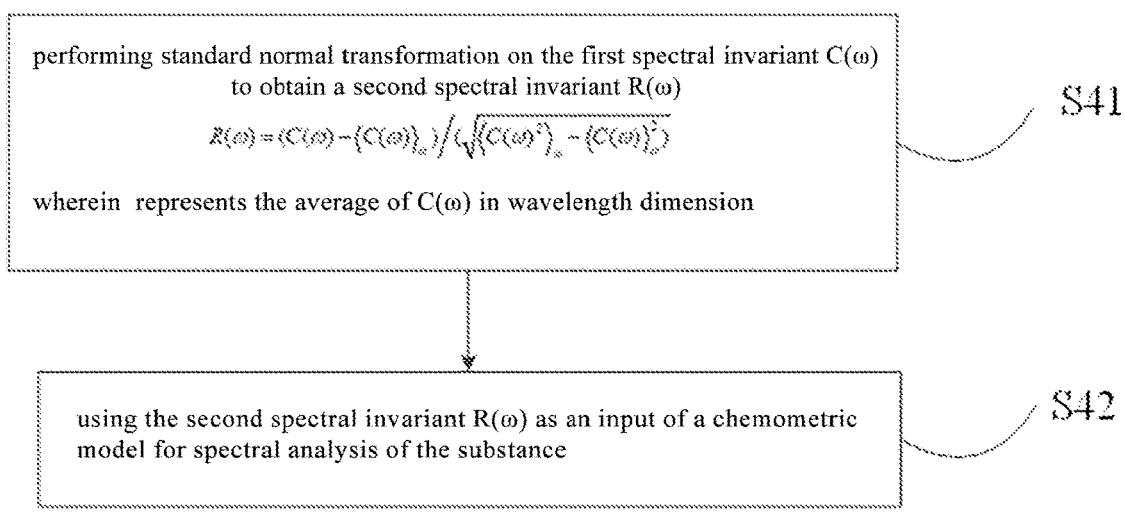
FIG. 4 is a flowchart of step S4 of the method for extracting spectral information of a substance under test in an embodiment of the present application.

In a preferred embodiment, as shown in FIG. 4, step S4 includes:

S41: performing standard normal variate transformation on the first spectral invariant $C(\omega)$ to obtain a second spectral invariant $R(\omega)$:

$$R(\omega) = (C(\omega)\langle C(\omega)\rangle_\omega)/\left(\sqrt{\langle C(\omega)^2\rangle_\omega - \langle C(\omega)\rangle_\omega^2}\right)$$

wherein $\langle C(\omega) \rangle_\omega$ represents the average of $C(\omega)$ in wavelength dimension;

S42: using the second spectral invariant $R(\omega)$ as an input of a chemometric model for spectral analysis of the substance.

In this step, the chemometric model includes a partial least square regression, an artificial neural network or a support vector machine. Therefore, a chemometric model that has been trained such as a partial least square regression (PLS), an artificial neural network (ANN) or a support vector machine (SVM) can be used to predict contents of the components of an apple and feed them back to the user. Specific steps of this part are not the focus of the present application, and hence will not be described in detail. The above method can simplify the hyperspectral analysis process, simplify the hardware structure, making the hardware of related products simpler and more compact. It can be carried out by means of one single hyperspectral image, which avoids errors resulting from many aspects such as changes in the spectrum of the light source, the baseline drift of the acquisition device, etc. As a result, the accuracy of component analysis can be increased.

Figure 5:
FIG. 5 is a schematic block diagram of a spectral camera in an embodiment of the present application.

An embodiment of the present application further proposes a hyperspectral imager, as shown in FIG. 5, comprising a lens 1, a wavelength splitter 2, an imaging device 3, and a data storage and processing device 4. Light emitted from a light source is reflected at the surface (including the shallow interior) of the object under test, reaching the imaging device 3 after passing through the lens 1 and the wavelength splitter 2, further converted by the data storage and processing device 4 into an electrical signal and a digital signal at different wavelengths. The digital signal is spectral image data comprising spectral information of the light source and substance spectral information at the surface of the object under test. Processed by the spectral information extraction method for objects under test as mentioned in the first aspect, spectral image data yields composition properties of the object. The uniqueness of the method for extracting spectral information of a substance under test as mentioned above is that there is no need to separately record the spectral information of the light source, and the substance spectral information, i.e. the spectral invariant, of the surface of the object under test can be obtained just through the spectral image data of the object under test. Since the spectral invariant reflects the spectral information of the surface (including the immediate interior) of the object under test, it can be used to calculate the substance properties of the surface (including the immediate interior) of the object under test. Taking the apple in the present application as an example, the spectral invariant can be used to calculate the sweetness, acidity, hardness, etc. of the apple.

An embodiment of the present application discloses a method for extracting spectral information of a substance under test. The method extracts a specular reflection region and a diffuse reflection region from the pixel region of the object under test, and calculate representative spectra of the two regions respectively, so as to calculate a light source-independent first spectral invariant and a second spectral invariant that is independent of the spectrum of the light source, the scene, etc. Since no additional light source spectral information is needed, the part of collecting a reference spectrum can be omitted, which simplifies the analysis process, and reduces the data collection time, thus improves the analysis efficiency. Meanwhile, since there is no need to collect a reference spectrum, at the time of designing corresponding hardware, the optical-electromechanical device of this part can be omitted, leaving hardware of the related product simpler and more compact. Implementation of this method requires one single hyperspectral image, therefore avoids errors resulting from many aspects such as changes in the spectrum of the light source, the baseline drift of the acquisition device, etc., increasing the accuracy of analysis.

What have been described above are only implementations of the present application or explanations thereof, but the protection scope of the present application is not so limited. Any variation or substitution that can be easily conceived by a skilled person familiar with this technical field within the technical scope revealed by the present application shall be encompassed within the protection scope of the present application. Therefore, the protection scope of the present application shall be based on the protection scope of the claims.

The invention claimed is:

1. A method for extracting spectral information of a substance under test, comprising the following steps:
    S1: identifying a pixel region A(x, y) occupied by an object under test from an acquired hyperspectral image;
    S2: extracting a specular reflection region $A_q$ and a diffuse reflection region $A_r$ from the pixel region A(x, y), and calculating a representative spectrum $I_q(\omega)$ of the specular reflection region $A_q$ and a representative spectrum $I_r(\omega)$ of the diffuse reflection region $A_r$, respectively; and S3: by comparing each element in the representative spectrum $I_q(\omega)$ of the specular reflection region $A_q$ with each element in the representative spectrum $I_r(\omega)$ of the diffuse reflection region $A_r$, separating information of a light source from spectral information of the object under test to obtain a first spectral invariant $C(\omega)$.

2. The method for extracting spectral information of a substance under test according to claim 1, further comprising the following step:
    S4: performing linear transformation processing on the first spectral invariant $C(\omega)$ to obtain a second spectral invariant $R(\omega)$, the second spectral invariant $R(\omega)$ being used for spectral analysis.

3. The method for extracting spectral information of a substance under test according to claim 2, wherein, step S4 comprises:
    S41: performing standard normal variate transformation on the first spectral invariant $C(\omega)$ to obtain the second spectral invariant $R(\omega)$:

$$R(\omega) = (C(\omega) \langle C(\omega) \rangle_\omega) / \left( \sqrt{\langle C(\omega)^2 \rangle_\omega - \langle C(\omega) \rangle_\omega^2} \right)$$

wherein $\langle C(\omega) \rangle_\omega$ represents an average value of $C(\omega)$ in a wavelength dimension; and S42: using the second spectral invariant $R(\omega)$ as an input of a chemometric model for spectral analysis of the object.

4. The method for extracting spectral information of a substance under test according to claim 3, wherein, the chemometric model comprises a partial least-square regression, an artificial neural network or a support vector machine.

5. The method for extracting spectral information of a substance under test according to claim 1, wherein, in step S1 a first region selection method is used to identify the object under test and select the pixel region A(x, y), the first region selection method comprising manual labeling, a machine vision algorithm, spectral angle mapping or a deep learning algorithm.

6. The method for extracting spectral information of a substance under test according to claim 1, wherein, step S2 comprises:
    S21: extracting the specular reflection region $A_q$ and the diffuse reflection region $A_r$ from the pixel region A(x, y) by using a second region selection method; and S22: obtaining the representative spectrum $I_q(\omega)$ according to the specular reflection region $A_q$, and obtaining the representative spectrum $I_r(\omega)$ according to the diffuse reflection region $A_r$.

7. The method for extracting spectral information of a substance under test according to claim 6, wherein, the second region selection method comprises principal component analysis, a k-means method, orthogonal projection, or a region selection based on geometric shapes.

8. The method for extracting spectral information of a substance under test according to claim 6, wherein, a method for calculating the representative spectrum $I_q(\omega)$ of the specular reflection region $A_q$ and the representative spectrum $I_r(\omega)$ of the diffuse reflection region $A_r$ comprises taking an average, taking a brightness weighted average, or a gray world algorithm.

9. The method for extracting spectral information of a substance under test according to claim 8, wherein, average spectral of all pixels in the specular reflection region $A_q$ and the diffuse reflection region $A_r$ are calculated respectively according to the specular reflection region $A_q$ and the diffuse reflection region $A_r$ as the representative spectrum $I_q(\omega)$ and the representative spectrum $I_r(\omega)$:

$$I_q(\omega) = \frac{1}{N_q} \sum_{(x_a, y_b) \in A_q} i(x_a, y_a, \omega),$$

$$I_r(\omega) = \frac{1}{N_r} \sum_{(x_a, y_b) \in A_r} i(x_a, y_a, \omega),$$

wherein $N_q$ and $N_r$ respectively represent numbers of pixels in the specular reflection region $A_q$ and the diffuse reflection region $A_r$, and $i(x_a, y_a, \omega)$ represents a spectrum of a pixel at a position $(x_a, y_a)$.

10. The method for extracting spectral information of a substance under test according to claim 1, wherein, a method for calculating the first spectral invariant $C(\omega)$ in step S3 comprises finite element decomposition, spectral angle separation or division.

11. The method for extracting spectral information of a substance under test according to claim 10, wherein, each element in the representative spectrum $I_q(\omega)$ of the specular reflection region $A_q$ is divided by each element in the representative spectrum $I_r(\omega)$ of the diffuse reflection region $A_r$ to obtain the first spectral invariant $C(\omega)$.

12. The method for extracting spectral information of a substance under test according to claim 1, wherein, the hyperspectral image maintains a pixel region $A(x, y)$ occupied by the object under test unchanged in each wavelength band during photographing, and the object under test occupies a certain portion in the hyperspectral image.

13. A spectral camera, characterized by comprising: a lens, a wavelength splitter, an imaging device, and a data storage and processing device, light emitted from a light source being reflected back from a surface of a substance under test, reaching the imaging device after passing through the lens and the wavelength splitter, and being converted by the data storage and processing device into an electrical signal and a digital signal at different wavelengths, the digital signal being spectral image data comprising spectral information of the light source and substance spectral information of the surface of the substance under test, wherein the data storage and processing device obtains substance properties of the substance under test by processing the spectral image data according to the method for extracting spectral information of a substance under test according to claim 1.

* * * * *